United States Patent [19]

Dancs

[11] 4,389,149
[45] Jun. 21, 1983

[54] APPARATUS FOR DUMPING A TOP-DUMPING MINE CAR

[75] Inventor: Tibor Dancs, Aurora, Colo.
[73] Assignee: Gulf Oil Corporation, Pittsburgh, Pa.
[21] Appl. No.: 287,079
[22] Filed: Jul. 27, 1981
[51] Int. Cl.³ .................. B65G 67/30; B65G 67/42
[52] U.S. Cl. .................................. 414/382; 74/37
[58] Field of Search .............. 414/376, 381, 382, 384, 414/386, 385, 575; 74/25, 37; 254/336, 385

[56] References Cited

U.S. PATENT DOCUMENTS

| | | |
|---|---|---|
| 425,607 | 4/1890 | Green . |
| 1,688,657 | 11/1928 | Repper .................... 414/386 |
| 2,393,695 | 1/1946 | Kling . |

Primary Examiner—Bruce H. Stoner, Jr.
Assistant Examiner—James Barlow
Attorney, Agent, or Firm—Deane E. Keith; Forrest D. Stine; Paul L. Tillson

[57] ABSTRACT

Apparatus for unloading a top unloading mine car that is mounted to pivot about a horizontal axis extending along one side of the base of the mine car includes a hoist chain detachably connected to the mine car at the side opposite the pivotal axis. The hoist chain extends upwardly over a pulley mounted on a positioning crank arm. The pulley moves on rotation of the crank arm from a position substantially vertically above the connection means when the mine car is in an upright position to a position above the pivotal axis. The hoist chain continues around a pulley mounted on a drive crank arm and then to an attachment of restricted mobility. The drive crank arm and the positioning crank arm are rotated in a single direction by drive means which are adapted to rotate the drive crank arm at twice the angular velocity of the positioning crank arm. On rotation of the crank arms the hoist chain rotates the top unloading car past the axis of rotation to dump the contents of the car and returns the car to the upright position. In a preferred embodiment, the attachment of restricted mobility of the hoist chain is a differential pulley. A compensating chain runs from the differential pulley over an idler pulley to a connection on the positioning arm to adjust the effective length of the hoist chain.

7 Claims, 7 Drawing Figures

APPARATUS FOR DUMPING A TOP-DUMPING MINE CAR

BACKGROUND OF THE INVENTION

1. Field of the Invention

This invention relates to apparatus for dumping mine cars and more particularly to apparatus which will without the control of an operator move a top-dumping mine car from its upright position to a dumping position and return the car to the upright position without reversing the power system driving the apparatus.

2. Description of the Prior Art

Top-dumping mine cars and many ladles for hot metals have an open-topped body mounted to rotate about a horizontal axis extending longitudinally of the car near its lower end. The cars have a connection point for a hoist chain at the side of the car opposite the axis of rotation. Ordinarily, the connection point is near the bottom of the car. The hoist chain extends from a motor driven windlass or drum located above the mine car and is connected to the mine car at the connection point. The windlass is rotated to shorten the chain and thereby rotate the mine car about its pivot until the center of gravity of the car swings past a line extending vertically from and above the axis of rotation, after which gravity causes the car to continue rotation to dump its contents through the open top. The maximum amount of rotation is limited either by the hoist chain or by a suitable stop. After the car is emptied, it is rotated in the opposite direction by means of the hoist chain to swing the center of gravity past the line extending vertically above the axis of rotation. Thereafter, gravity returns the car to the initial upright position.

In the apparatus heretofore available, it was necessary to reverse the direction of the motor driving the windlass four times during a cycle. As the car is tilted from the upright position to swing the center of gravity past the line vertically above the axis of rotation, the windlass is driven in a direction to shorten the length of the chain extending from the windlass. After the center of gravity passes the line extending from the axis of rotation and gravity will then cause continued rotation of the car, the direction of the rotation of the drum is reversed to lengthen the chain and allow rotation to continue to a point at which the contents can be dumped from the car through its open top. When dumping is completed, the direction of rotation of the drum is reversed to shorten the hoist chain and cause rotation of the car in the opposite direction to move the center of gravity of the car back over the line extending vertically from the axis of rotation. The direction of rotation of the drum is then again reversed to allow lengthening of the hoist chain and continued rotation of the car to its normal upright position. When dumping of the next car is begun, the direction of rotation of the drum is again reversed.

The center of gravity of the mine car will vary as the amount of ore in the car changes. The center of gravity of a car will be generally along the vertical center line between the axis of rotation and the point of attachment of the hoist chain. If the car is full of ore, the center of gravity will be higher in the car than when the car is empty. Variations in the location of the center of gravity cause variations in the degree of rotation necessary to cause the center of gravity to swing over a line extending vertically from the axis of rotation. If the ore in the car is sticky, only a portion of the ore may fall from the car when it is in the inverted dumping position. If dumping of the car is incomplete, it will then be necessary to rotate the car farther to swing the center of gravity over the line vertically above the axis of rotation to return the car to the upright position than if the car should be completely emptied. Conversely, less rotation from the upright position in which a car is delivered to the unloading station will be required to cause rotation to proceed by gravity if the car is completely filled rather than partially filled. Heretofore, control of the dumping operation has been by a skilled operator who utilizes the momentum of the rotating car to cause the center of gravity to swing through a vertical line through the axis of rotation. The operator utilizes his skill and experience in deciding just when to stop and reverse the direction of rotation of the windlass.

In U.S. Pat. No. 425,607 of W. W. Green, a mine dump car is operated by chains connected to each side of the dump car near its lower end. The chains pass over winding drums mounted above the car which shorten the effective length of the chain connected to the dump car to tilt it into a dump position. In the apparatus described in the patent, the position of the drum can be varied laterally to improve the angle of lift of the chain as the axis of rotation of the car is changed from one side to the other. The direction of rotation of the winding drum must be reversed as described above.

U.S. Pat. No. 2,393,695 of Kling illustrates apparatus for tilting a ladle in which a hook is adapted to be connected to the ladle near the bottom thereof at the side opposite the axis of rotation. The hook is suspended from a pulley which is made to move along a track which extends upwardly and laterally to rotate the ladle and cause molten metal in the ladle to flow from the upper end of the ladle. The ladle is brought back to its upright position by reversal of the motor causing movement of the pulley along the track.

SUMMARY OF THE INVENTION

This invention resides in apparatus which will rotate a top-dumping mine car to a position in which the top opening will face downward to dump the ore out of the top of the mine car and is rotated back to the upright position without the necessity of having an operator control movement of the car to and from the dumping position. A hoist chain adapted to be connected to the mine car near its lower end at the side opposite the axis about which the mine car pivots passes upwardly over a pulley on a positioning crank arm, and then to a pulley on a drive crank arm before attachment to means which limit the movement of the end of the chain remote from the connection to the mine car. The drive crank arm is caused to rotate at an angular velocity twice that of the positioning crank arm. Rotation of the crank arms in a single direction will cause rotation of a mine car from its upright position to a dumping position with its open top facing downward to dump ore from the car and then return the mine car to its upright position. The hoist chain exerts a positive force that moves the center of gravity of the car past a point vertically above the pivot axis both on rotation to dump the contents of the car and to return the car from the dumping position. The pulley on the positioning crank arm moves laterally to keep the pulley ahead of its point of attachment to the mine car and thereby prevents reaching a dead center position. Rotation of the drive crank arm in effect changes the length of the hoist chain as required as the connecting point on the mine car swings about the axis of rotation. In a preferred embodiment, the end of the hoist chain is attached to a differential pulley to ensure proper effective length of the hoist chain to meet the starting point and maximum dump position.

DESCRIPTION OF PREFERRED EMBODIMENT

Figure 1:
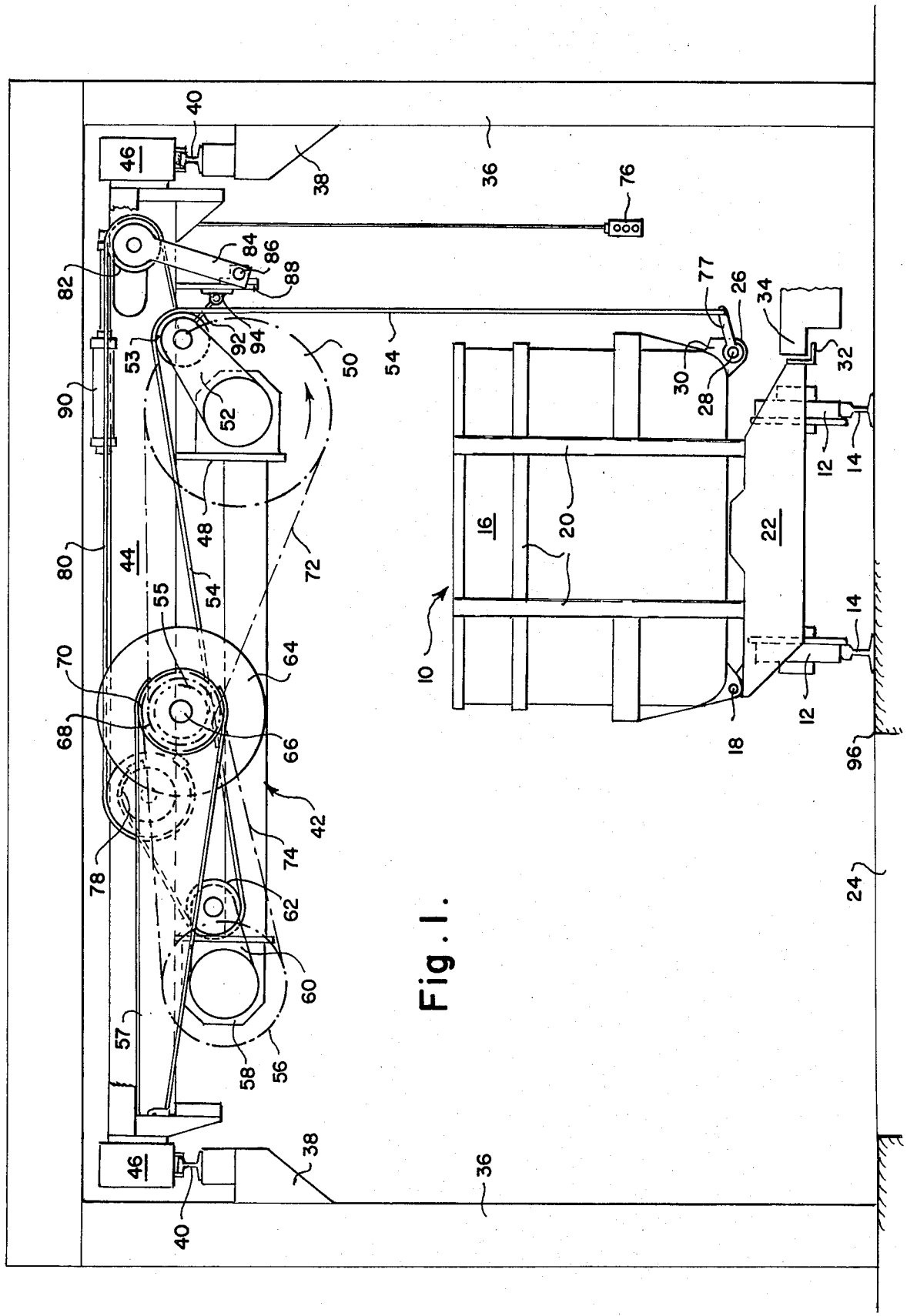
FIG. 1 is an elevational view of a preferred form of the apparatus installed above a track for mine cars.

Referring to FIG. 1 of the drawings, a mine car indicated generally by reference numeral 10 is illustrated having flanged wheels 12 that run on tracks 14. The mine car 10 includes an open-topped container 16 adapted to pivot around a pivot axis 18 that extends longitudinally of the car at one lower corner thereof. Reinforcing bars 20 on the car extend below the container 16 of the mine car and rest on the undercarriage 22 to support the container 16 in the upright position shown in FIG. 1. The tracks 14 may be on a trestle or other elevated structure to allow the desired rotation of the container 16 as the mine car is dumped, as hereinafter described. Alternatively, the rails 14 may be supported on a suitable base adjacent which is an opening 24 through which ore dumped from the mine car falls. Along the lower corner of container 16 opposite the pivot 18 is a connecting member 26. The connecting member 26 may consist of a rod 28 extending between a pair of spaced-apart brackets 30. A flange 32 of an angle secured to the undercarriage 22 extends outwardly below a retainer 34 to prevent overturning of the car 10 as a load of ore is dumped.

Figure 2:
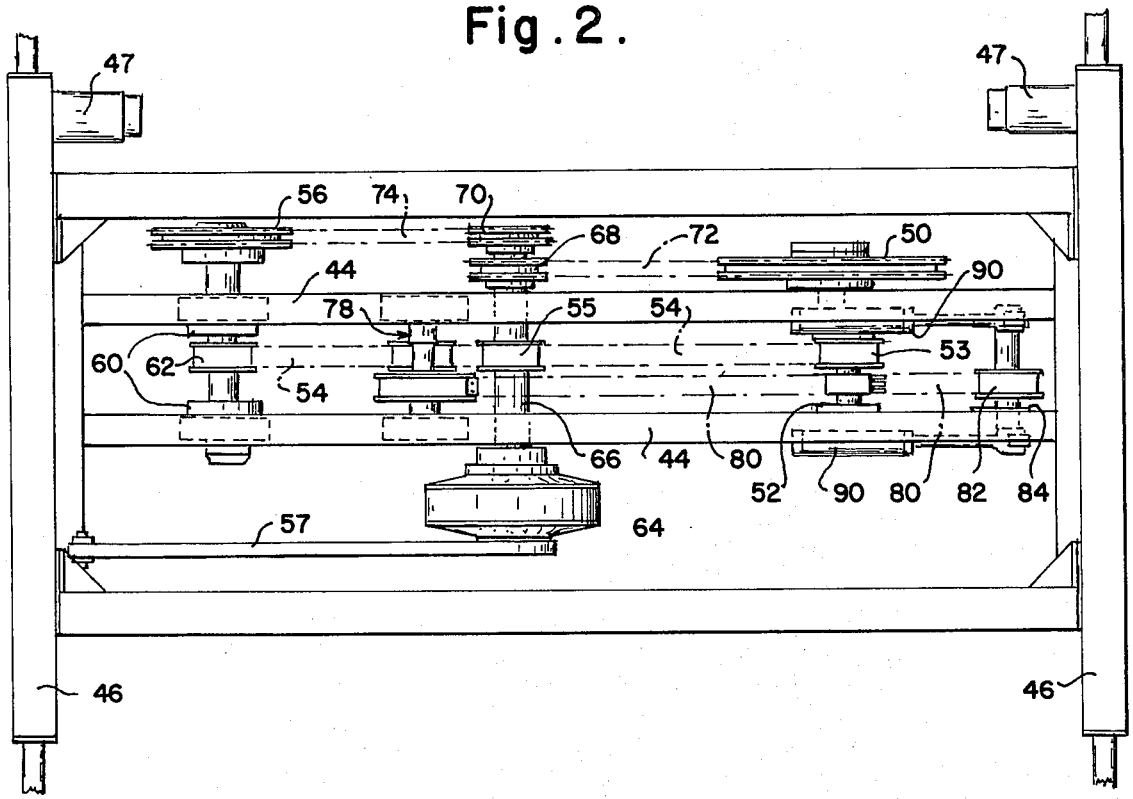
FIG. 2 is a plan view of the apparatus shown in FIG. 1.

Extending upwardly above the mine car 10 is a frame indicated generally by reference numeral 36 for supporting the apparatus of this invention. A pair of shoulders 38 extending inwardly from standards along the side of the frame provide support for rails 40 on which a carriage indicated generally by reference numeral 42 may move longitudinally of the mine car 16. The carriage shown in FIG. 1 includes two parallel spaced apart beams 44 connected to trucks 46 supported by wheels which ride on tracks 40. The carriage may be provided with a suitable drive mechanism, indicated by reference numeral 47 in FIG. 2, to move the carriage along the tracks 40 parallel to the tracks 14 to move the mine car dumping apparatus from one car to the next in a train of mine cars.

Keyed to a shaft rotatably mounted in supports 48 secured to beams 44 is a positioning crank arm 52. Keyed to the shaft extension is a sprocket 50 which results in the crank arm 52 rotating integrally with sprocket 50. A pulley 53 is mounted on the outer end of positioning crank arm 52. The designation "positioning" is used in identifying crank arm 52 to distinguish it from another crank arm in the apparatus. While a principal function of the crank arm 52 is establishing the lifting point of the apparatus, that crank arm does provide some lifting to rotate the mine car in the dumping operation. At the beginning of the dumping operation, the positioning sprocket 50 and crank arm 52 are located above the mine car 16 at a position that allows a hoist chain 54 to clear the side of container 16 and thereby facilitate connection of the hoist chain 54 to the connection member 26.

A drive sprocket 56 is secured to an extension of a shaft rotatably mounted in housings 58 secured to beams 44. In the embodiment illustrated, drive sprocket 56 is mounted near the end of the beam 44 opposite positioning sprocket 50. A drive crank arm 60 is keyed to the shaft on which the sprocket 56 rotates whereby the crank arm 60 and sprocket 56 rotate as a unit. A drive pulley 62 is rotatably mounted at the outer end of the drive crank arm 60.

Drive means for rotating the crank arms and thereby actuating the mine car dumping mechanism consist of a motor, preferably a hydraulic motor, mounted on the carriage 42. The motor 64 drives a shaft 66 on which a first sprocket 68 and a second sprocket 70 are keyed. The first sprocket 68 and the positioning sprocket 50 are connected by a first drive chain 72 while the second sprocket 70 and the drive sprocket 56 are connected by a second drive chain 74. Hydraulic motor 64 rotates sprockets 50 and 56 only in a counterclockwise direction as viewed in FIG. 1. The diameters of sprockets 56, 70, 68, and 50, and, consequently, the number of teeth on them, are such that the sprocket 56 is rotated by the hydraulic motor 64 at an angular velocity twice the angular velocity at which the sprocket 50 is rotated. Switch means 76 hang downwardly from the carriage to allow an operator to stop or start the rotation of hydraulic motor 64 and to control the drive mechanism for moving the trucks 46 along the tracks 40.

The hoist chain 54 extends from a suitable hook or shackle 77 adapted for connection to rod 28 upwardly over positioning pulley 53 and then around drive pulley 62 to a differential pulley 78 to which the end of the hoist chain 54 is attached. An idler collar 55, best shown in FIG. 2, rotatable on shaft 66 is in alignment with hoist chain 54 and engages the chain when pulleys 53 and 62 are above shaft 66. The end of the hoist chain could be attached to a suitable anchoring means to fix the location of that end of the hoist chain, but a differential pulley is preferred for the reasons hereinafter described. A compensating chain 80 is attached to the differential pulley 78 along a portion of that pulley that may have a diameter different from the diameter of the portion of the pulley to which the hoist chain is attached. The compensator chain 80 and hoist chain 54 extend around the differential pulley in opposite directions whereby unwinding of one chain winds the other chain on the pulley. The compensator chain 80 extends over an idler pulley 82 mounted on an idler arm 84 pivotally mounted at 86 on a hanger 88 from the beam 44. Compensator chain 80 extends around pulley 82 and is secured to the positioning crank arm 52. Idler 84 is urged to the right, as shown in FIG. 1, by a cushion cylinder 90. A stop 92 mounted on a swivel base 94 secured to hanger 88 prevents backward rotation of the crank arm 52 when the hydraulic motor is stopped.

Figure 3:
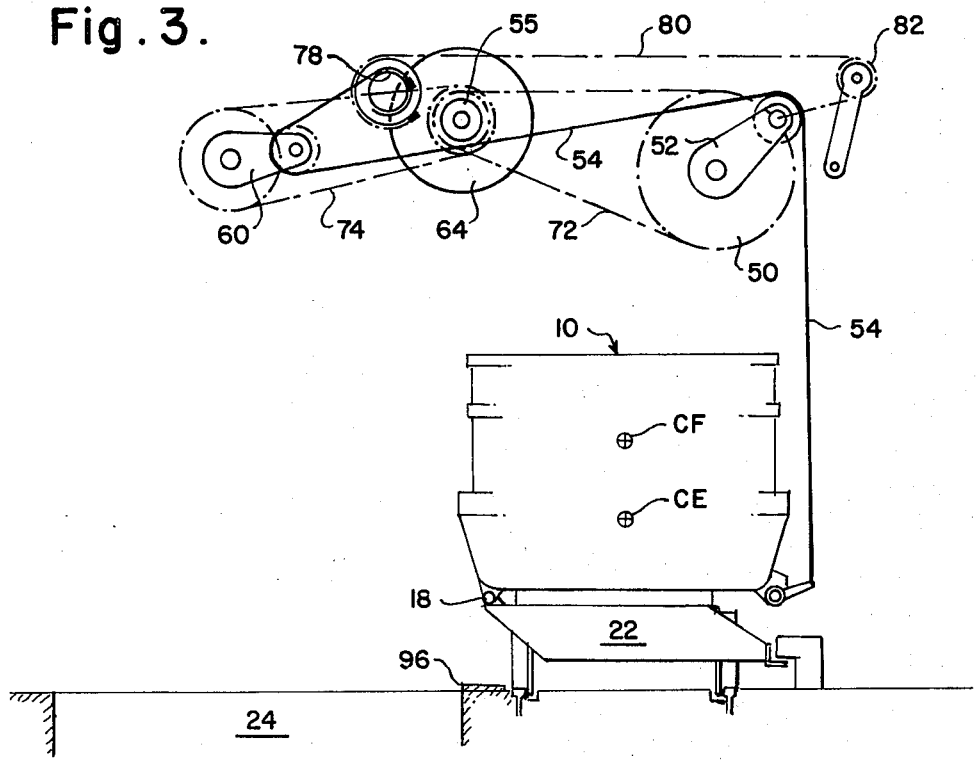
FIG. 3 is a diagrammatic view in elevation showing the mine car in the upright position. Certain details of the structure have been omitted to clarify the drawing.

In the operation of the mine car dumping apparatus of this invention, a loaded mine car 10 moves on tracks 14 to a position below the carriage 42 whereby the car and dumping apparatus are in the position shown in FIGS. 1 and 3. The hoist chain 54 hangs downwardly from the positioning pulley 53 to allow connection of the shackle 77 to the rod 28. The mine car dumping apparatus will usually be stopped when the apparatus is in the position shown in FIGS. 1 and 2 to permit release of the shackle 76 from the rod 28 on a car that has been dumped and connection of the shackle to the rod 28 on a mine car that is to be dumped. After the connection has been made, the hydraulic motor 64 is started by switch means 76.

Figure 4:
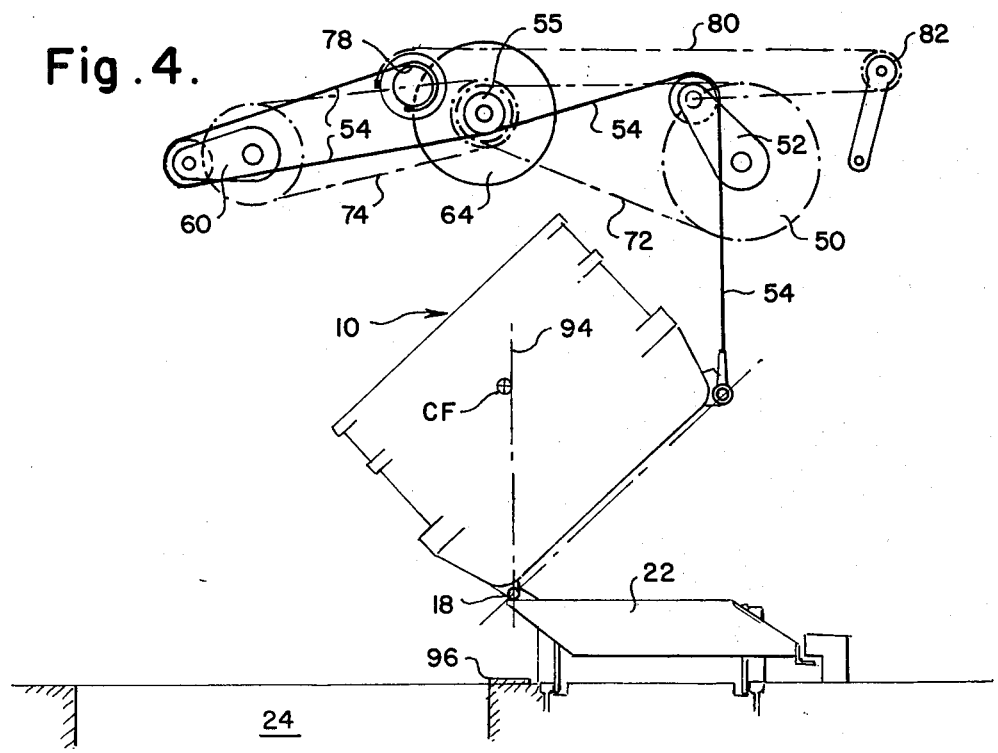
FIG. 4 is a diagrammatic view similar to FIG. 2 but showing the mine car as the center of gravity of a full car moves through a point vertically above the pivotal axis of the mine car.

Rotation of the hydraulic motor drives the drive sprocket 56 and the positioning sprocket 50 in the counterclockwise direction as viewed in the drawings. Drive crank arm 60 moves to the position shown in FIG. 4 farther away from the differential pulley 78, which movement has the effect of shortening the effective length of hoist chain 54 hanging from positioning pulley 53. The hoist chain lifts the connecting member 26 to rotate the mine car 10 about the pivot axis 18 to the position shown in FIG. 4 at which the center of gravity of a full car indicated by the reference letters CF has moved to a position to the left of a broken line 94 projected vertically upward from the pivot axis 18. Continued rotation of the positioning crank arm 52 from the position shown in FIG. 4 will increase the distance between the idler pulley 82 and the positioning pulley 53, thereby rotating the differential pulley clockwise to shorten the effective length of the hoist chain and continuing the lifting of the connecting member. That continued rotation also moves pulley 53 farther to the left to provide a force that will move the center of gravity of an incompletely filled car past projected line 94. After the center of gravity of the mine car passes line 94, the weight of the mine car and its contents will cause further rotation of the mine car in a counterclockwise direction toward the position illustrated in FIG. 5.

Figure 5:
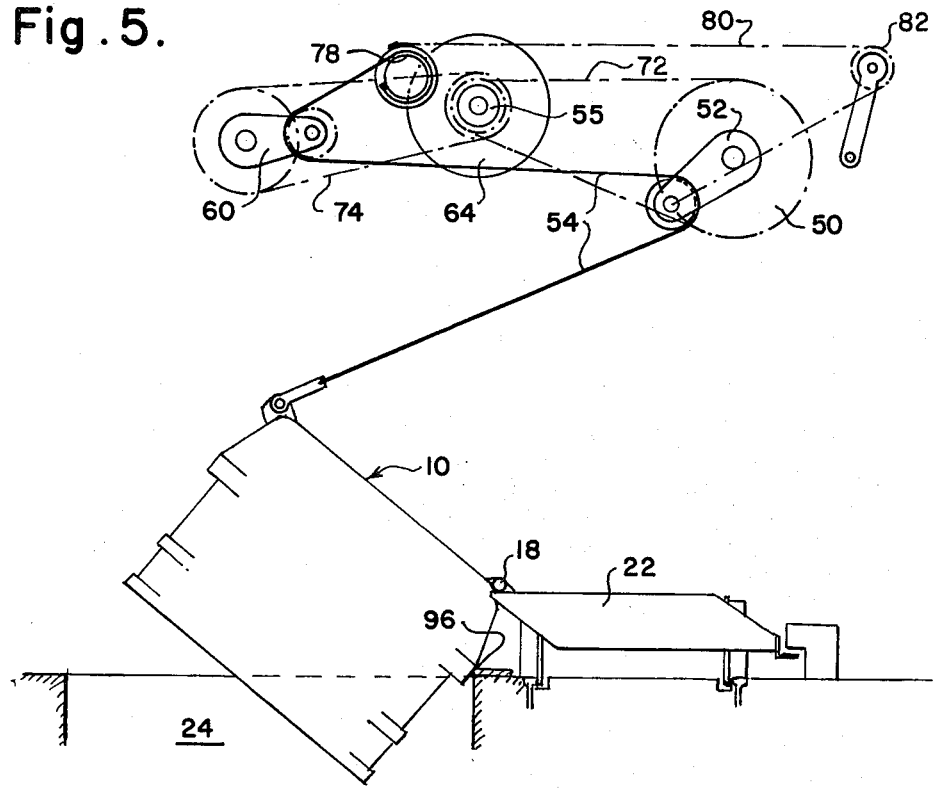
FIG. 5 is a diagrammatic view similar to FIGS. 3 and 4 with the mine car in the fully rotated position for dumping ore from the car.

As rotation of the mine car proceeds toward the position shown in FIG. 5 for dumping of the car, the distance between the positioning pulley 53 and the connection 26 to the mine car will begin to increase about the time the connecting member passes line 94. The necessary increase in the effective length of the hoist chain to take care of the increased distance between the positioning pulley 53 and connection 26 to the mine car is accomplished by the rotation of the drive crank arm 60 toward the position shown in FIG. 5. It will be noted in FIG. 5 that the drive crank arm 60 has made a full revolution from the position shown in FIG. 2 while the positioning crank arm 52 has moved only through 180°. A stop 96 may be provided to limit rotation of the mine car in the counterclockwise direction, or the hoist chain may serve that purpose.

Figure 6:
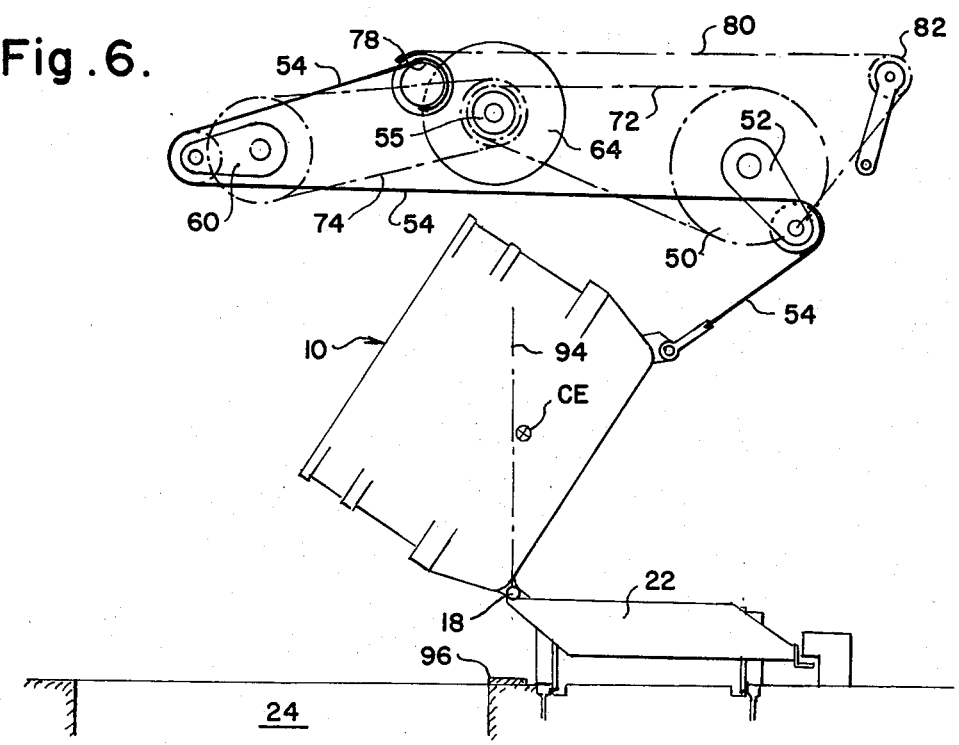
FIG. 6 is a diagrammatic view of the car and the apparatus for rotating it as the center of gravity of an empty car passes through a point vertically above the pivotal axis as the car returns to the upright position.

Continued rotation of the sprockets 56 and 50, and, consequently, crank arms 60 and 52 bring them to the position shown in FIG. 6, at which the center of gravity of the empty car 10 has moved past line 94 through the pivot axis 18. The weight of the mine car 10 will cause continued rotation in a clockwise direction toward the upright position shown in FIGS. 1 and 3. The chain pull on the mine car as it is rotating from the position shown in FIG. 5 to the position shown in FIG. 6 causes the center of gravity to swing past the vertical line 94 through the pivot axis, even though some of the ore may stick to the mine car. Moreover, continued rotation of crank arm 52 from the position shown in FIG. 6 continues to pull the mine car in the clockwise direction. The apparatus will, therefore, exert a force through the hoist chain that returns the mine car to the upright position even though ore should stick to the car when the car has been dumped. It is not necessary to rely on the momentum of the mine car to carry its center of gravity past line 94.

The differential pulley 78 insures the proper chain geometry to allow the hoist chain 54 to meet the end conditions of starting point and maximum dump position while preventing the hoist chain from becoming too short at an intermediate position. Referring to FIG. 3, it will be noted that the idler pulley 82 and the crank arm 52 are at their closest position. The differential pulley is therefore rotated by the hoist chain in a counterclockwise direction substantially as far as possible which results in the maximum unwinding of the hoist chain to permit connecting the hoist chain to connecting member 26. When the crank arms are in the position shown in FIG. 5, the idler pulley 82 and the crank arm 52 are apart as far as possible. The compensating chain 80 has, therefore, rotated the differential pulley substantially as far as possible in a clockwise direction, thereby reducing the effective length of the hoist chain to reduce slack in it. Further, shock on the hoist chain can be transmitted through the differential pulley to the compensating chain and dissipated by the cushion cylinder 90 allowing idler arm 84 to rotate in a counterclockwise direction.

If the hydraulic motor 64 should be stopped, the combined weight of the crank arms 52 and 60 tends to rotate the crank arm and sprocket 50 in a clockwise direction. Rotation in a clockwise direction is prevented by engagement of the crank arm with stop 92. Stop 92 can pivot in a clockwise direction from the position shown in FIG. 1 to permit the crank arm to pass the stop when the crank arm moves in the counterclockwise direction. Stop 92 cannot pivot in a counterclockwise direction past the position shown in FIG. 1.

Figure 7:
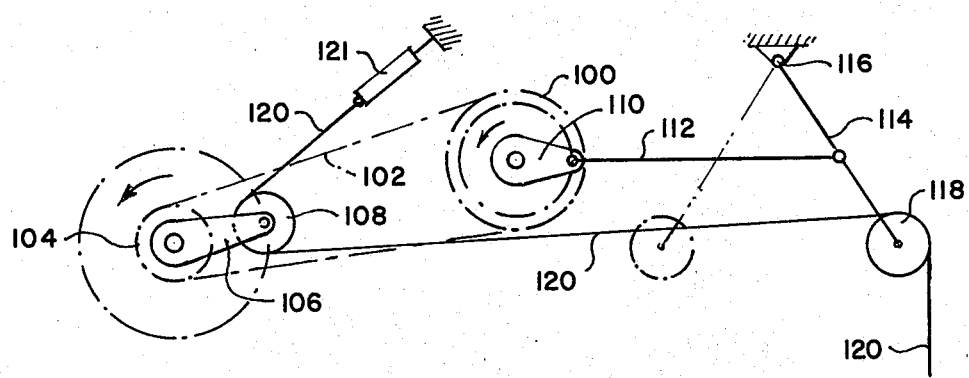
FIG. 7 is a diagrammatic view of a second embodiment of this invention in which the positioning crank arm moves a pulley mounted on a pendulum.

A second embodiment of this invention, illustrated diagrammatically in FIG. 7, has a motor sprocket 100 driven by suitable drive means such as a hydraulic motor, not shown, connected by a drive chain 102 with a drive sprocket 104. The diameter of the motor sprocket 100 and drive sprocket 104 are such that for each rotation of the motor sprocket the drive sprocket 104 rotates twice. Drive crank arm 106 mounted on the shaft of the drive sprocket 104 for rotation integrally therewith has a drive pulley 108 rotatably mounted on its end remote from the shaft of the drive sprocket.

Keyed on the shaft on which the motor sprocket 100 is secured is a positioning crank arm 110. The positioning crank arm is pivotally connected at its outer end to a connecting rod 112. The end of connecting rod 112 remote from the positioning crank arm 110 is pivotally connected to a positioning lever 114. Positioning lever 114 may rotate around its pivotal support 116. At the lower end of the positioning lever 114 is a positioning pulley 118. A hoist chain 120 which may be secured at its upper end 122 to a suitable shock absorber 103 or attached to a differential pulley such as differential pulley 78 shown in FIGS. 1–6, extends around drive pulley 108 and positioning pulley 118 and then continues downwardly from the positioning pulley 118 for connection to the connection means on a mine car.

The operation of the embodiment shown in FIG. 7 is similar to operation of the embodiment shown in the other figures of the drawings. When the positioning pulley 118 and the drive pulley 198 are in the position shown in FIG. 7 the mine car will be in its normal upright position. As the drive crank arm 106 rotates in a counterclockwise direction, the effective length of the hoist chain 120 is reduced thereby lifting the connection to the mine car. Upon rotation of the drive crank arm 180° from the position shown in FIG. 7, the positioning crank arm 110 will rotate through 90° and operate through connecting rod 112 to move the positioning lever 118 laterally to the left in FIG. 7 to a position adapted to cause the center of gravity of the mine car to swing past a vertical line through the pivotal axis of the mine car. The mine car will then continue to rotate by gravity to the dumping position corresponding to that shown in FIG. 5 at which time positioning pulley 118 will be at the position shown in broken lines in FIG. 7. At that time, the drive pulley 108 will have returned to the position shown in FIG. 7. Further rotation of crank arm 106 will have the effect of shortening the hoist chain 120 to lift the mine car from the fully inverted position to a position corresponding to that shown in FIG. 6 after which the weight of the car causes the mine car to return to the upright position. In this embodiment, as in the preferred embodiment, rotation of the positioning pulley moves the positioning pulley ahead of an extension of a line through the pivot axis of the car and the connection of the car thereby avoiding a "dead-center" condition at all times that the hoist chain is rotating the car.

The mine car dumping apparatus herein described will rotate a top-unloading car to an inverted position without the necessity of employing a skilled operator to control the dumping operation. The apparatus uses the force exerted by a chain hoist to move the center-of-gravity past a dead center position. It is not necessary to use the momentum of the car. An important advantage of the apparatus is that it is not necessary to reverse the direction of rotation at any time in the dumping operation.

I claim:

1. Apparatus for tilting a pivotally mounted top unloading mine car or the like comprising:
   (1) a hoist chain;
   (2) a positioning sprocket rotatably mounted above the car;
   (3) a positioning crank arm mounted on the sprocket for rotation therewith;
   (4) a drive sprocket;
   (5) a drive crank arm mounted on the drive sprocket for rotation therewith;
   (6) drive means connected to the positioning sprocket and the drive sprocket adapted to rotate the drive sprocket and positioning sprocket in a single direction and to rotate the drive sprocket at twice the angular velocity of the positioning sprocket;
   (7) a pulley mounted on each of the positioning crank arm and the drive crank arm;
   (8) said hoist chain being attached for limited movement at one end and extending over the pulley on the drive crank arm and the pulley on the positioning crank arm to a position with its other end adjacent the mine car; and
   (9) connecting means for detachably attaching said other end of the hoist chain to the mine car at a position laterally spaced from the pivotal mounting of the mine car whereby on rotation of the sprockets the hoist chain lifts its attachment to the mine car to rotate the mine car about its pivotal mounting to dump the car and to return it to the upright position.

2. In apparatus for tilting a pivotally mounted mine car having an open top to unload the car from the top, the improvement comprising:
   (1) a positioning sprocket;
   (2) a drive sprocket spaced from the positioning sprocket;
   (3) drive means constructed and arranged to rotate the positioning sprocket and the drive sprocket in a single direction and to drive the drive sprocket at twice the angular velocity of the positioning sprocket;
   (4) a positioning crank arm mounted on the positioning sprocket for rotation therewith;
   (5) a drive crank arm mounted on the drive sprocket for rotation therewith;
   (6) a pulley on each of the positioning crank arm and the drive crank arm spaced from the center of rotation of the respective crank arms; and
   (7) a hoisting chain attached at one end to the mine car remote from its pivot axis passing over each of the pulleys and attached at its other end to limit movement of said other end, said pulley on the positioning crank arm constructed and arranged to move laterally from a position substantially vertically above the connection to the mine car when the car is in upright position toward a position above the pivotal axis of the mine car and return upon rotation of the sprockets whereby the mine car rotates from an upright position to an unloading position with the top facing downwardly and returns to the upright position.

3. In apparatus for unloading a top-unloading, pivotally mounted mine car, the improvement comprising:
   (1) a hoist chain having means at one end for connection to the mine car;
   (2) a positioning crank arm having a positioning pulley connected to one end thereof spaced from the axis of rotation of the crank arm whereby the positioning pulley moves laterally on rotation of the positioning crank arm;
   (3) a drive crank arm having a drive pulley mounted on one end thereof remote from the axis of rotation of the drive crank arm, said hoist chain extending from the mine car connection means over the positioning pulley and onto the pulley on the drive crank arm and then to a point of attachment that limits movement of the hoist chain; and
   (4) driving means connected to the crank arms constructed and arranged to rotate the drive crank arm at twice the angular velocity of the positioning crank arm whereby movement of the pulley on the drive crank arm varies the effective length of the hoist chain and movement of the positioning pulley on rotation of the positioning crank arm maintains the point of support of the hoist chain ahead of the connection of the hoist chain to the mine car as the hoist chain lifts the connection to the mine car.

4. Apparatus for unloading a top unloading, pivotally mounted mine car or the like, said mine car having a horizontal pivot axis extending along one side thereof and connection means on the opposite side thereof comprising a positioning crank arm adapted to be mounted above the mine car, said positioning crank arm having a positioning pulley mounted on one end thereof spaced from the axis of rotation of the crank arm constructed and arranged such that on rotation of the positioning crank arm the positioning pulley moves laterally from substantially directly above the connection means on the mine car toward a position substantially directly above the pivot axis, a hoist chain having means at one end for connection to the connection means on the mine car and extending from said connection means over the positioning pulley, means for rotating the positioning crank arm whereby the positioning pulley moves alternately from and to a position above the connection means, and means for alternately increasing and decreasing the effective length of the hoist chain between the positioning pulley and the connection means whereby the hoist chain pulls the mine car through a dead center position at which the center of gravity of the car is directly above the pivot axis.

5. Apparatus as set forth in claim 1 characterized by an idler pulley and a differential pulley, a compensating chain connected at one end to the positioning crank arm and extending over the idler pulley to the differential pulley and the end of the hoist chain remote from the connecting means extending around the differential pulley in a direction opposite to that of the compensating chain whereby an increase in the distance between the idler pulley and the positioning crank arm winds the hoist chain on the differential pulley to reduce its effective length.

6. Apparatus as set forth in claim 5 characterized by the idler pulley being pivotally mounted and a cushioning fluid filled cylinder urging the idler pulley in a direction tending to wrap the hoist chain around the differential pulley.

7. Apparatus for tilting a pivotally mounted, top unloading mine car or the like having connection means along the side thereof remote from the pivotal mounting comprising a hoist chain, a positioning pulley mounted on the lower end of a pendulum, a connecting rod from the positioning crank arm to the pendulum adapted to move the positioning pulley laterally on rotation of the positioning crank arm, a drive crank arm having a drive pulley mounted on one end thereof remote from the axis of rotation of the drive crank arm, said hoist chain extending from the mine car connection means over the positioning pulley and around the pulley on the drive crank arm and then to a point of attachment that limits movement of the hoist chain, driving means connected to the crank arms constructed and arranged to rotate the crank arms in a single direction and to rotate the drive crank arm at twice the angular velocity of the positioning crank arm, said positioning crank arm being located above the mine car and adapted to move laterally on rotation of the positioning crank arm ahead of the connection of the hoist chain to the mine car as the hoist chain lifts the connection to the mine car.

* * * * *